Patented Jan. 11, 1944

2,338,987

UNITED STATES PATENT OFFICE 2,338,987

PREPARATION OF NITROGEN-PHOSPHORIC ACID COMPOUNDS FOR WATER SOFTENING

Rudolf Watzel, Mannheim, Germany; vested in the Alien Property Custodian

No Drawing. Application November 27, 1939, Serial No. 306,413. In Germany February 21, 1939

5 Claims. (Cl. 252—175)

The invention relates to a process for the production of nitrogen-phosphoric acid compounds having water-softening properties.

It has already been endeavored heretofore to produce similar compounds by starting from gaseous ammonia and solid phosphorus pentoxide. Apart from the fact that this process offers technical difficulties in its application it has the disadvantage that the reaction occurring in connection therewith takes place partly non-uniformly and partly incompletely, resulting in producing various products of varying composition and very slight yield. Besides, the products thus obtained further contain impurities consisting of by-products and unaltered initial material, smelling in watery solution strongly of phosphoretted hydrogen.

Now the surprising discovery has been made that homogeneous nitrogen-phosphoric acid compounds of high yield are obtained by reacting nitrogenous organic compounds, such as urea, nitriles, acid amides, or derivatives of carbamic acids with molecular-dehydrated or polymeric phosphoric acids, such as pyro-, poly- or metaphosphoric acids under heating.

As mentioned above it was usual in the production of such or similar products to start from $P_2O_5$ and gaseous ammonia. These substances, which were considered as especially reactive, have doubtlessly been selected in order to obtain as well defined and energetic course of reaction as possible. But if by using $P_2O_5$ and gaseous ammonia the reaction takes place in such unsatisfactory manner, it could not be expected in any way that so well defined and complete a reaction could be obtained when using the considerably more inactive reactants, such as urea, nitriles, acid amides, and derivatives of carbamic acids on the one hand, and the named phosphoric acids on the other hand.

In carrying out the process according to the invention the following method is used:

The primary materials, e. g. urea and a polymeric metaphosphoric acid, are mixed and heated in equimolecular or any other proportion. After the initial melting of the reaction mass there begins at a temperature of about 120–140° C. development of gas gradually intensifying. Carbon dioxide escapes first, followed by the development of ammonia. The end of the reaction is indicated by intense foaming and turning into a solid white and porous mass, which may be easily powdered after cooling.

The products of the reaction vary from those of weakly acid to those of neutral character, depending on the composition of the starting mixture. It seems that a part of the ammonia liberated during the reaction is used for neutralizing the acid groups. When using more than molecular proportions of urea, less acid products will be obtained, which is likely to be due to the decomposition to some extent of the excess urea and addition to acid groups. On the other hand, there will be obtained products of higher acidity when using lesser proportions of urea.

The reaction products are soluble in water and are capable of linking metal ions into complex state. They may also be used in the form of their alkaline salts or ammonia salts.

When heating the products more or less after the reaction has been completed, further separation of $NH_3$ will take place, whereby with increasing degree of heating the water solubility of the product thus obtained will decrease and the ability of changing metal ions into complex linking will increase. While at present it appears to be scarcely possible to ascribe a definite constitutional formula to the products of reaction, they may, on the other hand, be regarded as well characterized insofar, as the reaction will always take place definitely and completely and that the products of reaction of the same condition, same kind, same proportion of the primary materials, and same degrees and duration of heating will always show the same qualities. The products seem to be highly polymeric substances, whose degree of polymerization obviously increases with rising temperature giving off $NH_3$.

*Example 1.*—80 g. of a polymeric phosphoric acid, obtained by dehydrating ortho phosphoric acid, and containing about 88% $P_2O_5$ are thoroughly mixed with 60 g. of urea, resulting in slight heating. The mixture is then slowly heated, first until melting begins and then up to 140° C., whereupon reaction sets in accompanied by intensive development of $CO_2$. Development of $NH_3$ begins with continued reaction, finally followed by foaming of the product of reaction forming a white and porous mass which is powdered after cooling to give 106 g. Formula and constitution of the product not being known, exact calculation of the yield was impossible, but it is likely to correspond to a theoretic one considering the developed amounts of carbon dioxide and ammonia.

*Example 2.*—110 g. of 89% $H_3PO_4$ are mixed with 60 g. of urea and heated to 135° C. Reaction sets in under intensive foaming and is completed by maintaining a heat of 200° C. for several hours. After having been cooled the product of the reaction is pulverizable and has a composition and water-softening qualities similar to those of the products obtained by using anhydrous phosphoric acid.

*Example 3.*—50 g. of crystallized $H_3PO_4$ are dissolved in 20 g. of acetonitrile and refluxed at 150° C. for 5 hours. The acetic acid formed is then distilled. The yellowish tough mass is soluble in water and after neutralization shows water-softening qualities.

*Example 4.*—89 g. of ethyl urethane and 80 g. of anhydrous phosphoric acid of about 88% $P_2O_5$ content are gradually heated to 180° C. and maintained at this temperature for 1–2 hours. After neutralization the product also shows water-softening qualities.

It is to be understood that the process according to the invention is by no means limited to the compounds mentioned in the examples. As a matter of course also other nitriles, acid amides and derivatives of carbamic acids may also be reacted with the various molecularly dehydrated phosphoric acids.

What I claim is:

1. In the production of nitrogen-phosphoric acid compounds suitable for use in the softening of water and having the characteristic property of forming complexes with metal ions, the process which comprises heating and reacting together a polymeric phosphoric acid and urea, at atmospheric pressure, at temperatures within the range of about 120° to 200° C. and in substantially equimolecular proportions.

2. The process of making a compound for water-softening and the like comprising heating to between 120° and 200° C. at atmospheric pressure and until reaction ceases, substantially equimolecular quantities of a polymeric phosphoric acid and a nitrogen compound selected from the group consisting of urea, acetonitrile and urethane.

3. The process of making a compound for water-softening and the like comprising heating to between 120° and 200° C. at atmospheric pressure and until reaction ceases, substantially equimolecular quantities of a polymeric phosphoric acid and acetonitrile.

4. The process of making a compound for water-softening and the like comprising heating to between 120° and 200° C. at atmospheric pressure and until reaction ceases, substantially equimolecular quantities of a polymeric phosphoric acid and urethane.

5. The process of making a compound for water-softening and the like comprising heating to approximately 140° C. substantially equimolecular quantities of polymeric phosphoric acid and urea until foaming ceases and a white porous mass results.

RUDOLF WATZEL.